H. M. Clark,
Bed Bottom,
No. 63,993. Patented Apr. 23, 1867.
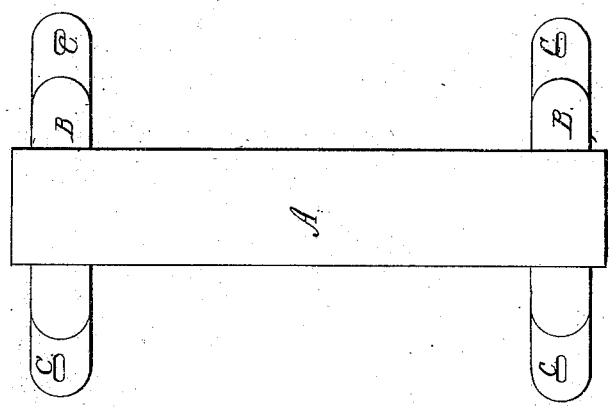
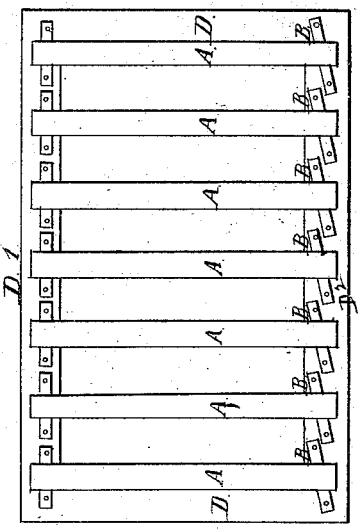
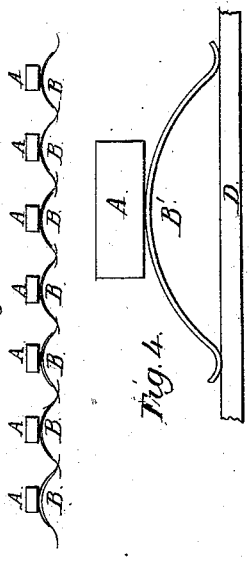
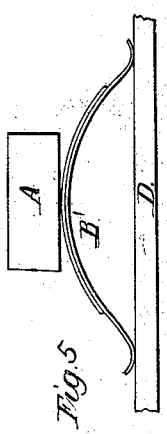
Witnesses:
John Ives
Asaw C. Lewres
Inventor:
Hezekiah M. Clark

United States Patent Office.

HEZEKIAH M. CLARK, OF WEST MERIDEN, CONNECTICUT, ASSIGNOR TO HIMSELF AND E. A. KELSEY, OF SAME PLACE.

Letters Patent No. 63,993, dated April 23, 1867.

---

IMPROVED BED BOTTOM.

---

The Schedule referred to in these Letters Patent and making part of the same.

---

TO ALL WHOM IT MAY CONCERN:

Be it known that I, HEZEKIAH M. CLARK, of West Meriden, county of New Haven, and State of Connecticut, have invented certain new and useful Improvements in "Spring Bottoms" for Beds, &c.; and to enable others skilled in the art to make and use the same, I will proceed to describe their construction and arrangement, by referring to the drawings, in which the same letters indicate like parts in each of the figures.

The nature of this invention consists in securing half-elliptic springs, of one or more leaf or thickness, to each end of the common slats, and then arranging the springs with the slats upon supporting strips or framework of a bedstead, one or both of these springs being secured in place, on said supporting strips or framework, by a small nail, screw, or their equivalents, placed through slits formed in the ends of the springs into said framework. In the accompanying drawings—

Figure 1 is a top or plan view of a "spring bottom."

Figure 2 is an end view of the same.

Figure 3, A, is a slat, as now in common use, having half-elliptic springs, B, secured on the under side and at each end thereof. These springs B are made of sheet steel, of half-elliptic shape, six inches (more or less) in length, and three-fourths of an inch (more or less) in width, each end of which is provided with slits, C, through which nails or screws pass into the supporting strips or framework D, for the purpose of holding them in place. These springs B are composed of one or more leaves of metal or steel, as may be desirable.

Figures 4 and 5 show an end view of the slats A, and an edge view of the half-elliptic shape springs, one of which, B, is a two-leaf spring; the other, B', is a one-leaf spring.

These springs are placed in a line and secured upon the frame or supporting strips $D^1$; and should it be desirable to arrange the slats A nearer together, the ends of the springs may pass by each other, as shown at $D^2$. In this way I am enabled to produce a cheap and efficient "spring bottom" of uniform yielding surface.

I believe I have thus shown the nature, construction, and advantage of this invention, so as to enable others skilled to make and use the same therefrom.

What I claim as my invention, and desire to secure by Letters Patent, is—

I claim the combination of the frame D, half-elliptic slotted springs B, attached to ends of transverse slats A, as and for the purpose specified.

HEZEKIAH M. CLARK. [L. S.]

Witnesses:
JOHN IVES,
ANDW. G. LOWERRE.